United States Patent
Tuo et al.

(10) Patent No.: US 11,929,078 B2
(45) Date of Patent: Mar. 12, 2024

(54) METHOD AND SYSTEM FOR USER VOICE IDENTIFICATION USING ENSEMBLED DEEP LEARNING ALGORITHMS

(71) Applicant: INTUIT INC., Mountain View, CA (US)

(72) Inventors: Shanshan Tuo, San Jose, CA (US); Divya Beeram, Newwark, CA (US); Meng Chen, Sunnyvale, CA (US); Neo Yuchen, Arcadia, CA (US); Wan Yu Zhang, Milpitas, CA (US); Nivethitha Kumar, Cupertino, CA (US); Kavita Sundar, Redwood City, CA (US); Tomer Tal, Cupertino, CA (US)

(73) Assignee: Intuit, Inc., Mountain View, CA (US)

( * ) Notice: Subject to any disclaimer, the term of this patent is extended or adjusted under 35 U.S.C. 154(b) by 230 days.

(21) Appl. No.: 17/183,006

(22) Filed: Feb. 23, 2021

(65) Prior Publication Data
US 2022/0270611 A1 Aug. 25, 2022

(51) Int. Cl.
| | |
|---|---|
| *G10L 17/04* | (2013.01) |
| *G06F 21/32* | (2013.01) |
| *G06N 20/20* | (2019.01) |
| *G10L 17/18* | (2013.01) |
| *G10L 17/26* | (2013.01) |
| *G10L 21/0208* | (2013.01) |

(52) U.S. Cl.
CPC .............. *G10L 17/04* (2013.01); *G06F 21/32* (2013.01); *G06N 20/20* (2019.01); *G10L 17/18* (2013.01); *G10L 17/26* (2013.01); *G10L 21/0208* (2013.01)

(58) Field of Classification Search
None
See application file for complete search history.

(56) References Cited

U.S. PATENT DOCUMENTS

| | | | |
|---|---|---|---|
| 10,074,089 B1 * | 9/2018 | Rangaraj | G06Q 20/40145 |
| 10,650,824 B1 * | 5/2020 | Kesharaju | G10L 17/00 |
| 11,200,884 B1 * | 12/2021 | Srinivasan | G10L 17/04 |
| 11,373,672 B2 * | 6/2022 | Mesgarani | H04R 25/507 |

(Continued)

OTHER PUBLICATIONS

Devi, Kharibam Jilenkumari, and Khelchandra Thongam. "Automatic speaker recognition with enhanced swallow swarm optimization and ensemble classification model from speech signals." Journal of Ambient Intelligence and Humanized Computing (2019): 1-14. (Year: 2019).*

(Continued)

*Primary Examiner* — Douglas Godbold
(74) *Attorney, Agent, or Firm* — Patterson + Sheridan, LLP

(57) ABSTRACT

Certain embodiments of the present disclosure provide techniques training a user detection model to identify a user of a software application based on voice recognition. The method generally includes receiving a data set including a plurality of voice interactions with users of a software application. For each respective recording in the data set, a spectrogram representation is generated based on the respective recording. A plurality of voice recognition models are trained. Each of the plurality of voice recognition models is trained based on the spectrogram representation for each of the plurality of voice recordings in the data set. The plurality of voice recognition models are deployed to an interactive voice response system.

18 Claims, 7 Drawing Sheets

(56) References Cited

U.S. PATENT DOCUMENTS

| | | | |
|---|---|---|---|
| 2015/0255068 A1* | 9/2015 | Kim | G10L 17/04 |
| | | | 704/246 |
| 2018/0082692 A1* | 3/2018 | Khoury | G10L 19/028 |
| 2018/0158463 A1* | 6/2018 | Ge | G10L 17/04 |
| 2018/0174599 A1* | 6/2018 | Du | G10L 15/02 |
| 2018/0293988 A1* | 10/2018 | Huang | G10L 17/20 |
| 2020/0211544 A1* | 7/2020 | Mikhailov | G10L 13/00 |
| 2020/0381130 A1* | 12/2020 | Edwards | G06Q 40/08 |
| 2021/0233541 A1* | 7/2021 | Chen | G10L 17/22 |
| 2021/0272571 A1* | 9/2021 | Balasubramaniam | |
| | | | G06N 20/00 |
| 2022/0084509 A1* | 3/2022 | Sivaraman | G06N 3/0454 |
| 2022/0108702 A1* | 4/2022 | Sheu | G10L 17/06 |
| 2022/0343921 A1* | 10/2022 | Jeong | G10L 17/14 |

OTHER PUBLICATIONS

Chettri, Bhusan, et al. "Ensemble models for spoofing detection in automatic speaker verification." arXiv preprint arXiv:1904.04589 (2019). (Year: 2019).*

Chebotar, Yevgen, and Austin Waters. "Distilling knowledge from ensembles of neural networks for speech recognition." Interspeech. 2016. (Year: 2016).*

Li Wan et al., Generalized End-To-End Loss for Speaker Verification, arXiv:1710.10467v5 [eess.AS] Nov. 9, 2020, 5 pages, <https://arxiv.org/pdf/1710.10467.pdf>.

Shaojie Bai et al., An Empirical Evaluation of Generic Convolutional and Recurrent Networks for Sequence Modeling, arXiv:1803.012371v2 [cs.LG] Apr. 19, 2018, 14 pages, <https://arxiv.org/pdf/1803.01271.pdf>.

* cited by examiner

METHOD AND SYSTEM FOR USER VOICE IDENTIFICATION USING ENSEMBLED DEEP LEARNING ALGORITHMS

INTRODUCTION

Embodiments of the present disclosure relate to voice recognition in computing systems, and more specifically to training and using machine learning models to identify users of a computing system based on audio recordings of user interactions with the computing system.

BACKGROUND

In various computing systems, such as support systems associated with a software application, techniques can be used to identify and authenticate the user that is calling into the support system. Generally, a customer identity verification system may be used as a gateway into the support system. To identify and authenticate the user, the customer identity verification system can use interactive voice response techniques to pose questions to the user. These questions may include secret questions that a user previously selected for authentication purposes for which answers are user-defined and freeform, questions based on user profile information (e.g., to request personally identifiable information that the user should know but other persons should not know, such as a driving license number, a Social Security Number or portion thereof, or the like). Typically, these interactive voice response techniques capture a recording of a user response, convert the response to a textual representation, and attempts to match the textual representation to the user profile information. If a match is identified between the textual representation and the user profile information, the customer identity verification system can identify and authenticate the user and route the user request to the appropriate support system for resolution. Otherwise, the user may be routed to a live support system that allows a support agent to manually identify and authenticate the user.

Identification and authentication of users in a support system using interactive voice authentication techniques may be a time-consuming and inaccurate process. Generally, when interactive voice authentication techniques are unable to identify and authenticate the user, the customer identity verification system can pose additional questions to the user. If further questions are unsuccessfully answered using these interactive voice authentication techniques, the customer identity verification system can route the user to other systems for verification. Thus, in such cases, user identification and verification using automated techniques may fail, and user identification and verification may fall back to manual techniques that may be time and labor intensive and may delay resolution of user support requests. Further, because voice-to-text transcription may not accurately transcribe voice recordings of user utterances, inaccurate transcription may lead to failures to identify and authenticate users. This may create a processing loop in which inaccurate transcription of a voice recording leads to an interactive voice authentication system posing another question to a user, the answer to which is also inaccurately transcribed. Thus, interactive voice authentication techniques may not be able to accurately identify and authenticate or user or may not be able to identify and authenticate a user at all.

Accordingly, techniques are needed to efficiently identify and verify users in a support system for a software application.

BRIEF SUMMARY

Certain embodiments provide a computer-implemented method for training a user detection model to identify a user of a software application based on voice recognition. The method generally includes receiving a data set including a plurality of voice interactions with users of a software application. For each respective recording in the data set, a spectrogram representation is generated based on the respective recording. A plurality of voice recognition models are trained. Each of the plurality of voice recognition models is trained based on the spectrogram representation for each of the plurality of voice recordings in the data set. The plurality of voice recognition models are deployed to an interactive voice response system.

Still further embodiments provide a computer-implemented method for identifying users of a software application based on voice recognition. The method generally includes receiving a recording of a user utterance from a live support session with a user of a software application. A feature vector representative of the user utterance is generated based on a spectrogram representation of the received recording. A plurality of embedding vectors for the user utterance are generated by processing the generated feature vector through a plurality of trained voice recognition models. A plurality of users are selected from a database of users based on a match between source contact information associated with the live support session and contact information included in user profiles for users of the software application. For each respective user of the plurality of users, a similarity score is calculated between embedding vectors associated with the respective user and the generated plurality of embedding vectors for the user utterance. A matching user is identified from the plurality of users as a user of the plurality of users having a highest calculated similarity score. The live support session is routed to a support agent. The live support session generally includes information identifying the matching user.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain embodiments of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
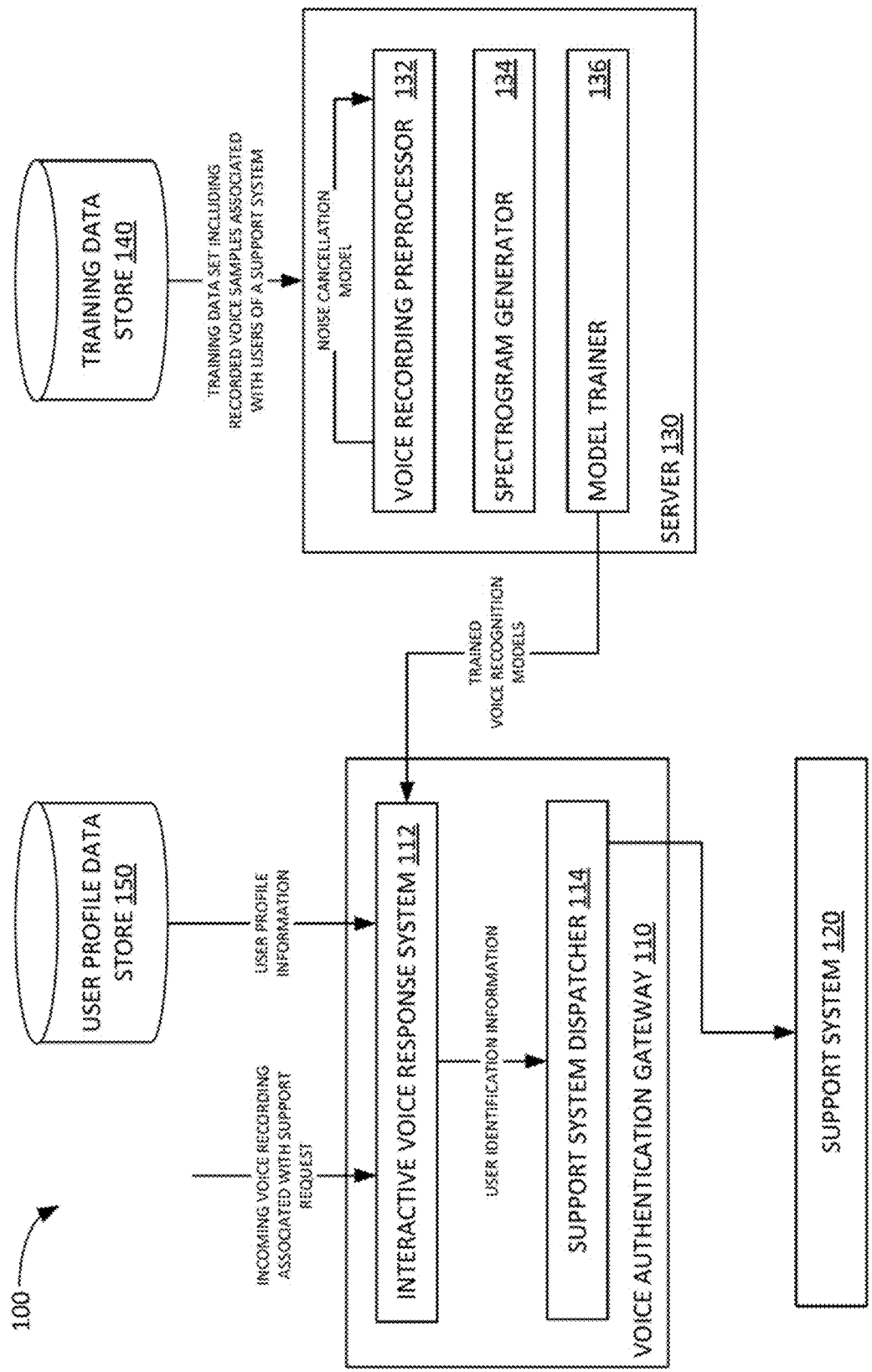
FIG. 1 illustrates an example computing environment in which machine learning models are trained and used in voice-recognition-based user identification and authentication for a software application.

Embodiments of the present disclosure provide apparatuses, methods, processing systems, and computer-readable mediums for training and using machine learning models to identify users of a software application based on voice recognition. Generally, these machine learning models may be trained using previously recorded samples of user voice interaction with, for example, a live support system. The trained machine learning models may take an incoming user voice interaction recording as input and identify a user associated with the incoming user voice interaction based on matches between the user voice interaction recording (or a representation derived therefrom) and historical user voice interactions.

User identification and authentication based on interactive voice authentication techniques generally involves posing questions to a user of a software application and receiving a vocal response. The vocal response may be converted to text and compared to information in a user profile data store to identify and authenticate the user. However, various circumstances may complicate interactive voice authentication, leading to the expenditure of additional computing resources and other inefficiencies involved in attempting to automatically identify and authenticate a user by asking additional questions and/or routing user support requests to live support systems for user identification and authentication.

For example, if a user is interacting with an interactive voice authentication system on a poor quality connection, the resulting recording of a user voice interaction may not be of sufficient quality to accurately extract textual information from the recording. In another example, voice-to-text conversion used in interactive voice authentication techniques may not be able to accurately convert a voice recording to text. For example, voice-to-text conversion systems used in interactive voice authentication may be trained using a set of words spoken according to common manners of speaking, such as Received Pronunciation in the United Kingdom or the General American accent in the United States. These systems, however, may not be as accurate in converting recordings in dialects or accents other than those that the voice-to-text conversion systems are trained to recognize; thus, interactive voice authentication techniques may pose additional questions to users who speak using these regional dialects or accents or route these users to live support systems for user identification and authentication. Further, even when these systems are able to successfully convert voice recordings to text and identify a user associated with the voice recordings, these systems may not accurately match voice recordings to the right user. Thus, to ensure that users are correctly identified and authenticated, additional processing may be needed, which may use further time and other compute resources.

Embodiments described herein generally accelerate user identification and authentication in computing systems by identifying users using machine learning models trained to match an incoming voice recording of a user utterance to historical voice recordings—and the users associated with these voice recordings. By using these machine learning models to match incoming voice recordings to historical voice recordings and to identify the user associated with the incoming voice recording, user identification and authentication may be performed without using voice-to-text conversion or other techniques that may not be able to accurately convert voice recordings to textual representations that can be used to identify and authenticate a user (e.g., by matching the textual representations against user profile information). Thus, limited user interaction with an interactive voice authentication system may be needed to identify and authenticate a user, which may reduce the amount of time and computing resources needed for user identification and authentication and may accelerate the process of resolving support requests in a software system.

Example Systems for Training and Using Machine Learning Models to Identify and Authenticate Users of Software Applications Based on Voice Recognition FIG. 1 illustrates an example computing environment 100 in which voice recognition models are trained and used in voice-recognition-based user identification and authentication for a software application.

As illustrated, computing environment 100 includes a voice authentication gateway 110, support system 120, server 130, training data store 140, and user profile data store 150. Computing environment 100 may be, for example, an environment through which users request support in using a software application that is locally deployed or accessible through one or more on-demand computing instances. It should be noted that the processing of support requests in computing environment 100 may be performed on a single physical computing device (e.g., a server), a cluster of computing devices, a virtualized environment in which services hosted by virtual machines executing on one or a cluster of computing devices, or any other computing environment in which requests to execute or perform functions may be received from external software applications or services.

Voice authentication gateway 110 is generally representative of a gateway through which users of a software application can submit support requests for dispatch to the appropriate support system 120. These support requests may be received, for example, via a public switched telephone network (PSTN), a cellular communications network, an Internet Protocol network, or other communications networks through which voice communications can be performed. As illustrated, voice authentication gateway 110 includes an interactive voice response system 112 and a support system dispatcher 114.

Interactive voice response system 112 generally uses one or more trained voice recognition models trained by, for example, server 130 (as discussed in further detail below) to identify and authenticate users submitting support requests. To identify and authenticate a user, interactive voice response system 112 generates a feature vector representative of an incoming voice recording associated with a support request. The feature vector may be generated by first converting the incoming voice recording from data in the time domain into one-dimensional data in the frequency domain. This conversion may be performed, for example, by applying a Fourier transform to the incoming voice recording. Based on the frequency domain data generated from the incoming voice recording, interactive voice response system 112 can generate a spectrogram representation of the voice recording showing relative power of each frequency (or frequency range) in the voice recording. In some aspects, the voice recording may be split into a plurality of time frame windows, and each time frame window may independently be converted from data in the time and frequency domains into one-dimensional data in the frequency domain. The frequency domain data for each of the plurality of time windows may be converted into a respective spectrogram and the spectrogram representation of the voice recording from which a feature vector is generated may be composed by concatenating each of the respective spectrograms into a single representation.

In some embodiments, interactive voice response system 112 can generate an embedding vector from the feature vector (e.g., the spectrogram representation generated from an incoming voice recording, as discussed above) using the one or more trained voice recognition models. The trained voice recognition models may be implemented as, for example, a long-short term memory (LSTM) model, a convolutional neural network (CNN), or a temporal convolutional network (TCN), to name a few examples. Generally, a single embedding vector may be generated by each of the trained voice recognition models. Each embedding vector generally represents a mapping of the feature vector representing the incoming voice recording to an internal embedding representation of the incoming voice recording in one of the voice recognition models. As discussed in further detail below, similarities between previously generated embedding vectors for a user and the embedding vector generated for the incoming voice recording can be used to identify a matching user and route the support request to the support system 120 for processing based on information associated with the matching user.

To identify and authenticate the user associated with the incoming voice recording, interactive voice response system 112 can identify a probable set of users based on other information associated with the incoming voice recording. For example, suppose that a phone number through which the interactive voice response system 112 is being accessed is shared amongst a plurality of users for which user profile information exists in user profile data store 150. Interactive voice response system 112 can assume that the incoming voice recording, and the associated support request, is coming from one of the users associated with the phone number and not from other users; thus, to minimize the amount of processing needed to identify the user associated with the incoming voice recording, interactive voice response system 112 can limit the universe of possible users against which the incoming voice recording is compared to those associated with the phone number and exclude users not associated with the phone number.

For each respective user of the identified users, interactive voice response system 112 can generate a similarity score between the embedding vector generated for the incoming voice recording and an average embedding vector generated for the respective user by each of the one or more voice recognition models. The similarity score may be, for example, calculated as a cosine similarity between the embedding vector generated for the incoming voice recording and an average embedding vector generated for the respective user by each of the one or more voice recognition models. In some embodiments, the similarity score may be generated as a weighted sum of the similarity scores generated for each embedding vector generated for the respective user by the one or more voice recognition models, which may allow for multiple voice recognition models to be used in identifying the user associated with the incoming voice recording. For example, if an LSTM model, a convolutional neural network (CNN) model, and a temporal convolutional network (TCN) model are used in identifying the user associated with the incoming voice recording, the final similarity score may be weighted according to the following equation:

$$\text{similarityScore} = 0.5(\text{similarityScore}_{TCN}) + 0.3(\text{similarityScore}_{LSTM}) + 0.2(\text{similarityScore}_{CNN}),$$

where $\text{similarityScore}_{TCN}$ represents the cosine similarity between the embedding vector generated for the incoming voice recording by a TCN model and a TCN-generated embedding vector associated with a user in user profile data store 150; $\text{similarityScore}_{LSTM}$ represents the cosine similarity between the embedding vector generated for the incoming voice recording by an LSTM model and an LSTM-generated embedding vector associated with a user in user profile data store 150; and $\text{similarityScore}_{CNN}$ represents the cosine similarity between the embedding vector generated for the incoming voice recording by a CNN model and a CNN-generated embedding vector associated with a user in user profile data store 150. The weightings assigned to each of the one or more voice recognition models may be based, for example, on model performance and may be parameters learned during training of the one or more voice recognition models that may be adjusted as model performance changes (e.g., through re-training the voice recognition models using additional data). It should be recognized that the weights discussed above are only examples, and other weighting values can be used in generating a similarity score for the pairing of an incoming voice recording and a user of the plurality of users associated with the phone number (or other contact information) from which the a support request is being received.

Interactive voice response system 112 generally uses the similarity score calculated for an incoming voice recording to determine the user with which the incoming voice recording is most likely associated. To do so, interactive voice response system 112 can compare the similarity scores generated for each of the plurality of users with a threshold similarity score. Scores that are below the threshold similarity score may be deemed to be associated with users that are highly unlikely to be the user from whom the incoming voice recording was received. Thus, the users associated with these scores, may be removed from the plurality of users with which the incoming voice recording may be matched. Out of the remaining scores, interactive voice response system 112 can select the user associated with the highest calculated similarity score as the user with which the incoming voice recording (and thus, the support request) is associated, and provide the identification of the user to support system dispatcher 114 for further processing.

In some embodiments, if none of the similarity scores are above the threshold similarity score value, interactive voice response system 112 may request additional information to aid in identifying and authenticating the user from whom the incoming voice recording was received. For example, the interactive voice response system 112 may pose additional questions to obtain additional voice recording samples that interactive voice response system 112 can analyze using the one or more voice recognition models, as discussed above. In some embodiments, if the voice recognition models continue to be unable to identify the user associated with the incoming voice recordings, interactive voice response system 112 can fall back to other identification and authentication techniques, such as voice-to-text conversion and comparison to known data in user profile data store 150 to identify the user. If the fallback techniques for user identification and authentication also fail, interactive voice response system 112 can route the support request to a support system 120, such as a support system through which live support through an agent is provided, for manual user identification and verification and for resolution of the request.

Support system dispatcher 114 uses the identification of the user generated by interactive voice response system 112 and other information included with an incoming support request to route the support request to an appropriate support system. For example, support system dispatcher 114 can use localization information included in a user profile for the identified user to route the incoming support request to the appropriate support system 120 associated with the same location as that included in the user profile. In another example, support system dispatcher 114 can use information about a product with which the identified user is associated to route the incoming support request to the appropriate support system 120.

Server 130 is generally representative of a system on which the one or more voice recognition models for identifying a user based on user voice samples is trained and deployed to voice authentication gateway 110. As illustrated, server 130 includes voice recording preprocessor 132, spectrogram generator 134, and model trainer 136.

Voice recording preprocessor 132 generally retrieves a training data set of voice recordings, which may include interactions between users of a software application and interactive voice response system 112, and preprocesses the voice recordings in the training data set. Generally, preprocessing the training data set of voice recordings may include truncating voice recordings, dividing a voice recording into multiple portions, normalizing the voice recordings to a defined maximum and minimum volume, performing noise cancellation on the voice recordings (e.g., to compensate for extraneous information in a recording introduced by communications links of varying quality), and the like.

In some aspects, voice recording preprocessor 132 can truncate the voice recordings to remove silent periods in each of the voice recordings. To identify silent periods in a voice recording, voice recording preprocessor 132 can examine the volume of an audio output at each of a plurality of time windows in the voice recording. When voice recording preprocessor 132 identifies a time window at which the audio output volume is below a threshold level, voice recording preprocessor 132 can remove content in the identified time window from the voice recording. By removing silent periods in the voice recordings, voice recording preprocessor 132 can reduce the size of the audio recordings used to train the one or more voice recognition models and can ensure that only information relevant to identifying a user based on voice recognition is included in the audio recordings. In some aspects, voice recording preprocessor 132 can normalize the truncated voice recordings so that the truncated voice recordings have a similar volume level. To do so, a minimum and maximum volume level may be defined (e.g., a minimum decibel level and a maximum decibel level). Based on the minimum and maximum volume level in a voice recording, each truncated voice recording may be adjusted so that the minimum and maximum volume level of each truncated voice recording is the same.

In some aspects, to perform noise reduction on the voice recordings in the training data set, voice recording preprocessor 132 can use a noise reduction model trained to generate a noise-cancellation voice recording from an input of an original voice recording. Voice recording preprocessor 132 can train the noise cancellation model by adding noise to voice recordings in a clean data set. To add noise to a voice recording, voice recording preprocessor 132 can use various random data generation techniques to generate random data that is to be combined with the voice recordings in the clean data set. For example, voice recording preprocessor 132 can generate noise using a Gaussian noise generator or other random data generation techniques. In another example, noise may be obtained from public noise data sets or based on conversation gaps in a plurality of recordings where neither party in a two-party voice conversation is talking, as period in which no party is speaking may be considered a period in which random noise, but no other data, can be captured. The noise cancellation model may be trained based on the clean data set and the noisy data set so that the noise cancellation model can recognize and cancel random noise from other voice recordings. For example, the noise cancellation model may be a deep neural network trained to generate a clean recording, or an approximation of a clean recording, from an input of a corresponding noisy recording. Supervised learning techniques may be used to train the noise cancellation model based on mappings between the voice recordings in the noise data set and the voice recordings in the clean data set. In some aspects, the noisy data set used to train the noise reduction model may be a set of spectrograms generated from the combination of the voice recordings and random noise, and the clean data set used to train the noise reduction model may be a set of spectrograms generated from the voice recordings without the addition of the random noise.

Spectrogram generator 134 generally transforms voice data into image data that can be used to train the one or more voice recognition models to identify users of a software application based on voice recognition techniques. To transform voice recordings in the training data set, spectrogram generator 134 can divide a voice recording into a plurality of segments. For each of the plurality of segments, spectrogram generator 134 can perform a Fourier transform against the audio data in the segment to generate a frequency spectrum representation of the audio data over the duration of the segment. The frequency spectrum representations may be converted into a colored image, where a first color in the image represents no data at a given frequency and a second color in the image represents a maximum amount of data at a given frequency. A continuous gradient between the first color and the second color may represent some amount of data at a frequency that is between the minimum and maximum amount of data. Image data generated for each of the plurality of segments may be concatenated into a single spectrogram representation of the voice recording, and the spectrogram representations generated for each of the plurality of voice recordings in the training data set may be used by model trainer 136 to train the one or more voice recognition models. In some aspects, spectrograms generated by spectrogram generator 134 may be generated based on pre-processed voice recordings generated by voice recording preprocessor 132, which may include voice recordings that have been truncated to remove silent periods in the voice recordings, normalized to a standard volume, and/or processed using various noise reduction techniques to remove noise and improve the quality of the recordings prior to generation of the spectrograms.

Model trainer 136 is generally configured to train one or more voice recognition models based on the spectrogram representations of the voice recordings in the training data set to identify users based on matches between an incoming audio recording and historical audio recordings of user interactions with an interactive voice response system 112. As discussed, in some aspects, model trainer 136 can train a plurality of models, the outputs of which may be ensembled by interactive voice response system 112 to identify the user associated with an incoming support request based on voice recognition techniques. For example, the one or more voice recognition models may include an LSTM model, a CNN model, and a TCN model. Each of the models may be trained using a same set of dimensions. For example, the models may be trained using an input tensor having a size of 160×40 elements to generate an output of a 256-dimension embedding vector. The LSTM model may have three layers, each with a hidden dimension of 256. The CNN may have three layers of one-dimensional convolutional layers, combined with a max pooling and flattening layers, followed by a feedforward network. The TCN may have a single TCN layer and a dense layer with 256 dimensions. It should be understood, however, that these dimensions are illustrative of example dimensions that may be used to define the voice recognition models trained by model trainer 136 but are not limiting, and that voice recognition models with other dimensions may be trained and deployed as described herein.

To train the one or more voice recognition models, model trainer 136 can select a number N of speakers and a number M of recordings per speaker from the training data set of voice recordings. For the selected number of speakers and number of recordings per speaker, and a number of dimensions P=256, model trainer 136 can generate a tensor with dimensions N*M*P. The contents of this tensor may be, for example, may be the results of a forward pass through a neural network. This tensor may be transformed into a similarity matrix with dimensions N*M*N, which may allow for a similarity score to be generated for each pair of voice recordings and for each speaker. A predictive vector may be generated from the similarity matrix. The resulting predictive vector may have a size of N*M, and each entry in the predictive vector may include an indication of a speaker predicted to be associated with each of the N*M recordings.

Generally, model trainer 136 extracts a plurality of features from the spectrogram representation associated with each of the plurality of voice recordings in the training data set and passes the extracted plurality of features through a neural network, such as an LSTM network, a CNN, or TCN, to generate an embedding vector for each of the plurality of features. To generate the similarity matrix based on these embedding vectors, a centroid for each embedding vector e associated with a sample k may be represented by the equation:

$$c_k = \frac{1}{M}\sum_{i=1}^{M} e_{ki}$$

when sample k is not associated with a given speaker j (i.e., sample k is a negative sample for speaker j). When sample k is associated with a speaker j, the centroid for the embedding vector e associated with that sample k may be represented by the equation:

$$c_j^{(-i)} = \frac{1}{M}\sum_{\substack{m=1\\m\neq i}}^{M} e_{jm}$$

A similarity score between embedding vectors may be calculated, for example, based on a cosign similarity between the centroid calculated for an embedding vector associated with a given sample k and another embedding vector. The similarity score may be calculated according to the equation:

$$S_{ji,k} = \begin{cases} w \cdot \cos(e_{ji}, c_j^{(-1)}) + b \text{ if } k = j; \\ w \cdot \cos(e_{ji}, c_k) + b \text{ otherwise} \end{cases}$$

where w represents weight parameters in the neural network and b represents a bias parameter in the neural network. The w and b parameters may be the parameters learned by a voice recognition model during training, based on mappings between spectrograms representing voice recordings in the training data set and the user with which each of the voice recordings is associated. Based on the similarity scores calculated for each pairing of voice recordings, model trainer 136 can associate a voice recording with a specific user by labeling a target recording with information identifying the specific user and include this information in the similarity matrix. The resulting similarity matrix may thus, define the similarities between an embedding vector e and centroids generated for each sample k in the data set.

Model trainer 136 may, in some aspects, train the plurality of voice recognition models based on calculating a loss based on a cross-entropy between a predictive vector and a ground truth vector associated with each of the plurality of voice recordings in the training data set. To do so, model trainer 136 may examine the calculated loss between the predictive vector and the ground truth vector to determine whether the calculated loss indicates that the predictive vector and ground truth vector are sufficiently similar (e.g., the calculated loss is less than some threshold amount). If the calculated loss indicates that the predictive vector and ground truth vector are sufficiently similar, model trainer 136 can associate the predictive vector with a user associated with the ground truth vector (and the corresponding voice recording in the training data set).

In some aspects, model trainer 136 can reserve a subset of the voice recordings in the training data set for use in refining the one or more voice recognition models. To refine a voice recognition model, model trainer 136 can select, for a user, an evaluation set of voice recordings (which may be selected from the reserved subset of voice recordings) and attempt to identify that the user is associated with the recordings in the evaluation set using the voice recognition model. If the voice recognition model matches a recording in the evaluation set to some other speaker, the pairing of the actual speaker, the other speaker, and the recording may be saved in training data store 140 for further use. The voice recognition model may be subsequently re-trained based on a mapping of the actual speaker to the other speaker to improve the accuracy of the model and minimize situations where a speaker is erroneously matched when the voice recognition model is deployed to interactive voice response system 112.

Generally, to accelerate the process of identifying and authenticating users of an interactive voice response system, a lookup table may be established in user profile data store 150. For each user having a profile in user profile data store 150 (e.g., each user of a software application through which support is provided by voice authentication gateway 110 and one or more support systems 120), model trainer 136 can generate an embedding vector using each of the plurality of voice recognition models. Model trainer 136 may write each of these embedding vectors to the lookup table in user profile data store 150 and associate each of these embedding vectors to a specific user record in user profile data store 150. The lookup table may be deployed for use with an interactive voice response system, such as interactive voice response system 112, for use in identifying users associated with incoming voice recordings by using embedding vectors generated for the incoming voice recordings as a search key.

Figure 2:
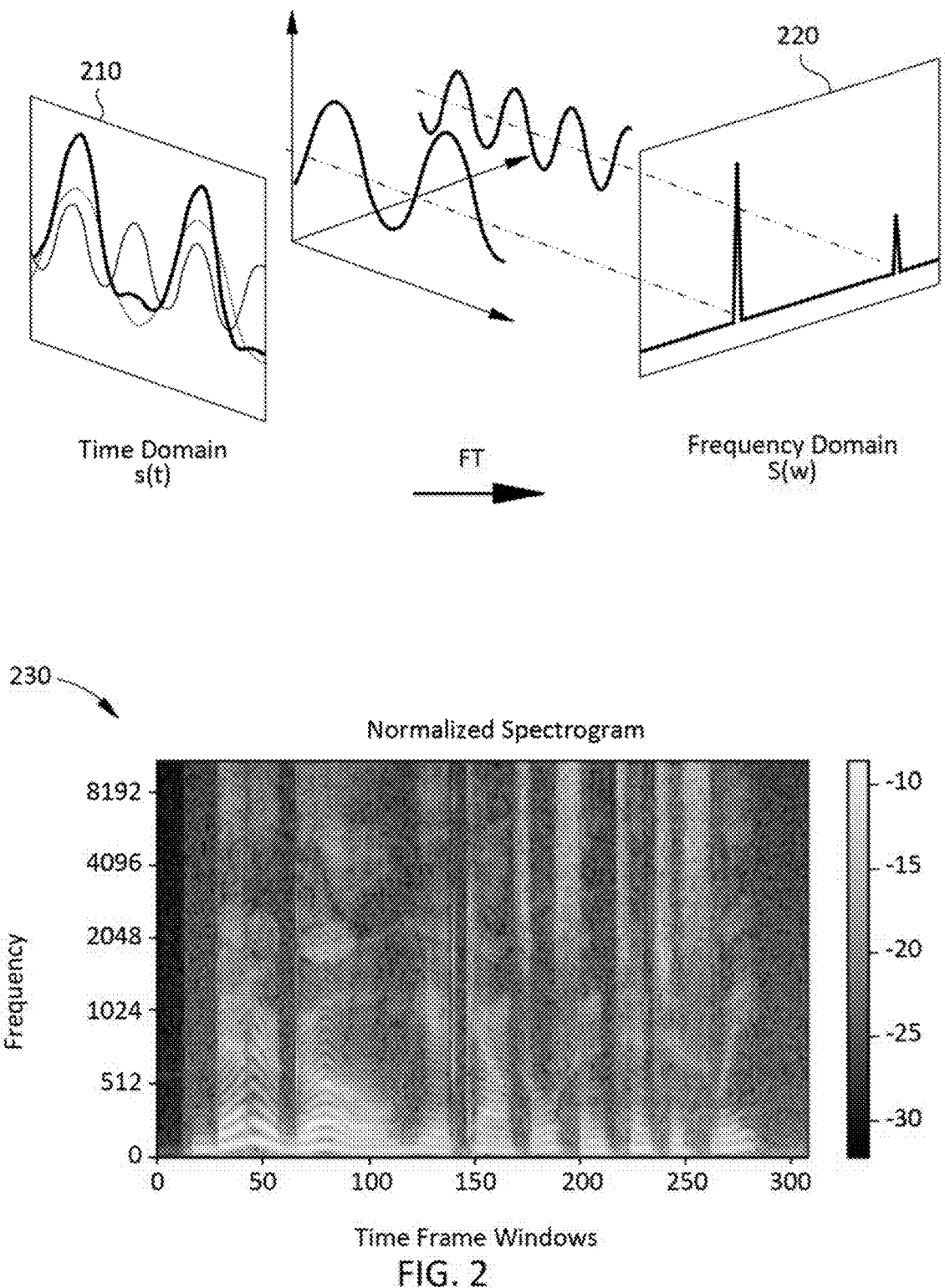
FIG. 2 illustrates an example transformation of a recording of a user voice interaction into a spectrogram representation used to train machine learning models for voice-recognition-based user identification and authentication.

Example Spectrograms Generated from Audio Recordings for Voice-Recognition-Based User Identification and Authentication FIG. 2 illustrates an example transformation of a recording of a user voice interaction (e.g., with an interactive voice response system) into a spectrogram representation used to train machine learning models for voice-recognition-based user identification and authentication.

To generate a spectrogram representation of an audio recording that can be used to train machine learning models for voice-recognition-based user identification and authentication, a system can convert a time-domain representation 210 of the audio recording into a frequency-domain representation 220 from which a normalized spectrogram 230 can be generated. An audio recording of a user interaction with an interactive voice response system may be represented as a waveform s(t) in the time domain. Each discrete point in the time domain may represent a specific amplitude (e.g., audio volume) of the audio data captured at a given time. Because two recordings may appear similar in terms of amplitude but may be significantly different in the frequency domain (e.g., where two speakers speak at a similar volume but using different vocal ranges), the time domain waveform associated with an audio recording may not be usable for user identification and verification. However, the time domain representation s(t) of the audio recording includes frequency domain data that may be used to distinctly identify the user. To obtain the frequency domain representation 220 (S(ω)) of the audio recording, a Fourier transform can be applied to the time domain representation 210 (s(t)). The resulting frequency domain representation S(ω) of the audio recording may include amplitude information at each of the plurality of frequencies included in the audio recording.

To generate normalized spectrogram 230, the frequency domain representation 220 of the audio recording may be normalized based on a defined minimum volume (amplitude) and a defined maximum volume (amplitude). Based on the normalized frequency domain representation 220, the normalized spectrogram 230 may be generated with different colors in the normalized spectrogram 230 being associated with different volume (amplitude) levels. In some aspects, the normalized spectrogram 230 may be generated by generating independent spectrograms for each of a plurality of time windows in the time-domain representation 210 of the audio recording. The independent spectrograms may be concatenated into a single normalized spectrogram 230 to generate a frequency domain illustration of the audio recording that can be used to train machine learning models for voice-recognition-based user identification and authentication and to match an incoming voice recording to a user of a software application using the trained machine learning models.

Figure 3:
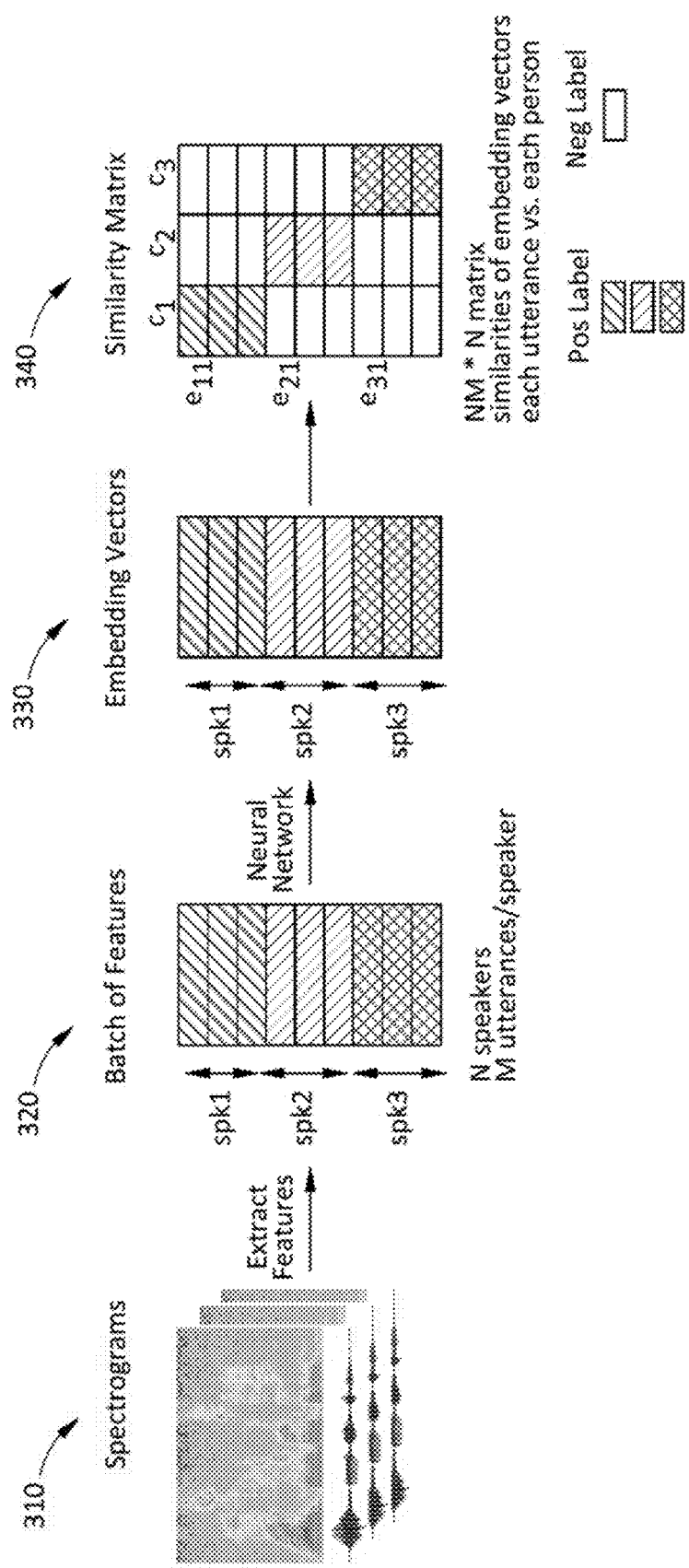
FIG. 3 illustrates an example mapping of a spectrogram representation of a recorded user voice interaction to an embedding vector and similarity matrix used in identifying the user associated with the user voice interaction using one or more machine learning models.

Example Mapping of a Spectrogram Representation of a Recorded Voice Interaction to an Embedding Vector and Similarity Matrix For Identifying and Authenticating Users Using Voice Recognition Models FIG. 3 illustrates an example mapping of a spectrogram representation of a recorded user voice interaction to an embedding vector and a similarity matrix used in identifying the user associated with the user voice interaction using one or more voice recognition models. As discussed, these voice recognition models may include one or more trained voice recognition models, such as an LSTM-based model, a CNN-based model, or a TCN-based model.

As discussed, voice recordings of user voice interactions (e.g., in the form of audio files, such as WAV files or other types of compressed or uncompressed audio files) may be converted to spectrogram representations 310 of the recorded user voice interactions. Each spectrogram representation may be an image file representing the frequencies present in each of a plurality of time slices in one of the plurality of recorded user voice interactions. While a single spectrogram representation 310 is illustrated in FIG. 3, it should be recognized that spectrogram representations may be generated for each of the plurality of voice recordings used in training the voice recognition models for identifying and authenticating users based on recorded voice interactions.

A voice recognition model can extract one or more features and generate a batch of features 320. As illustrated, the batch of features may include a plurality of features for each of a plurality of N speakers and M samples per speaker. The batch of features may be structured as a one-dimensional array having N*M entries, and features extracted from each user may be grouped together so that the features extracted for a first speaker precede the features extracted for a second speaker, and so on.

Using a deep neural network, such as an LSTM network, a CNN, or a TCN, embedding vectors 330 may be generated from the batch of features 320. The embedding vector 330 generally includes, for each of the N*M recordings from which the batch of features 320 was extracted, a voice recognition model-generated representation of each feature. Generally, each of the voice recognition model-generated representations may be a value in a low-dimensional space into which each feature in the batch of features 320 may be mapped. That is, each embedding vector in the array of embedding vector 330 may be generated as the output of an embedding layer in a deep neural network in which data may be transformed from an original representation in a high-dimensional space into a low-dimensional (compressed) space, and each embedding vector may represent a compressed or otherwise reduced-size version of the spectrogram representation of a voice recording in a training data set.

Similarity matrix 340 may be generated from the array of embedding vectors 330. The similarity matrix may have the dimensions of N entries (as illustrated on the horizontal axis) by N*M entries (as illustrated on the vertical axis). Each entry on the horizontal axis may represent a specific user which the voice recognition model may be trained to identify and authenticate, and each entry on the vertical axis may represent one of the plurality of embedding vectors in the array of embedding vectors 330. To generate similarity matrix 340, a centroid may be calculated for each user in the similarity matrix, and a similarity score may be calculated based on a cosine similarity between the calculated centroid for a user and the embedding vector for a voice recording from which the batch of features 320 was generated. Each row in the similarity matrix 340 may include a single cell set to a value indicating a matching user to the utterance associated with an embedding vector in the column corresponding to the index of the matching user. The other cells in the row may be set to a value indicating a mismatch to the utterance associated with an embedding vector associated with the row in the similarity matrix.

Figure 4:
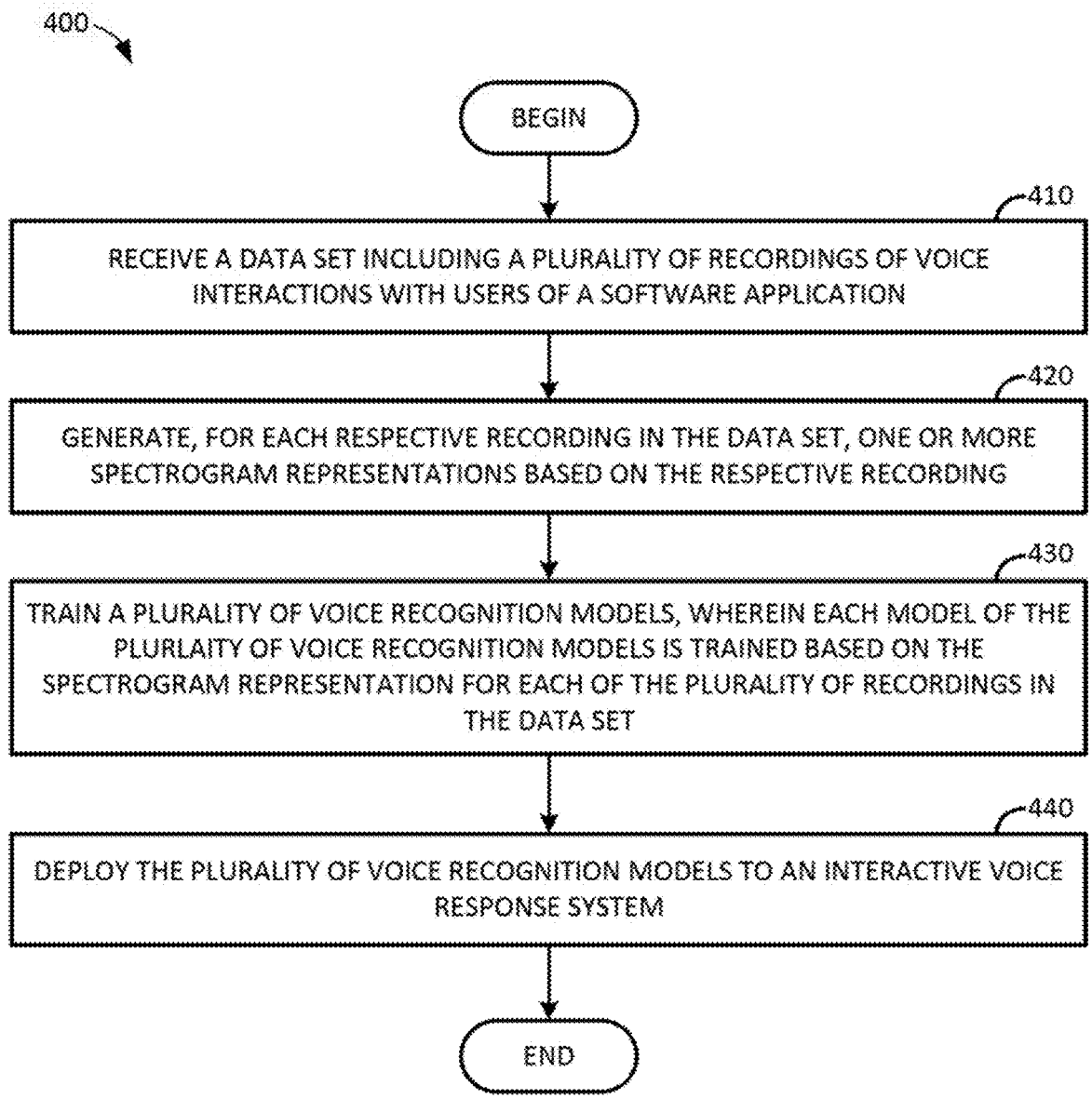
FIG. 4 illustrates example operations for training voice recognition models for identifying and authenticating users of a software application.

Example Training of Voice Recognition Models for Identifying Users of a Software Application FIG. 4 illustrates example operations 400 for training voice recognition models to identify and authenticate users of a software operation. The operations described herein may be performed by one or more systems in a computing environment, such as server 130 illustrated in FIG. 1.

As illustrated, operations 400 begin at block 410, where a system receives a data set including a plurality of recordings of voice interactions with users of a software application. The data set generally includes a number of voice recordings for each user of the plurality of users of the software application. A first subset of the recordings may be used for training the voice recognition model, a second subset of the recordings may be used for validating the trained voice recognition model, and a third subset of the recordings may be used for testing and refining the trained voice recognition model. Generally, the data set of recordings may be received from a training data store in which raw, unedited audio files captured by an interactive voice response system (e.g., interactive voice response system 112 illustrated in FIG. 1) are persisted.

At block 420, the system generates, for each respective recording in the data set, one or more spectrogram representations based on the respective recording. For example, a recording may be divided into a plurality of independent utterances, and a spectrogram representation may be generated for each of the plurality of independent utterances. To generate the one or more spectrogram representations for each respective recording, the system can divide the respective recording (or the portion of the respective recording associated with one of the plurality of independent utterances) into a plurality of time windows. A Fourier transform may be applied to the data corresponding to each of the plurality of time windows to convert the data from an audio waveform in the time domain to data in the frequency domain. Amplitude (volume) information in the frequency domain representation of each of the plurality of time windows may be converted into image data based on a gradient between a first color or hue corresponding to a minimum amplitude and a second color or hue corresponding to a maximum amplitude in the frequency domain representation of the voice recording. The image data for each of the plurality of time windows may be concatenated together into a single spectrogram representation of the respective recording.

In some aspects, the plurality of recordings of voice interactions may be preprocessed prior to generating the spectrogram representations of the recordings. Preprocessing may be performed, for example, to remove silent periods in each of the plurality of recordings, which may reduce the amount of data that the system uses to train the plurality of voice recognition models. Some preprocessing may be performed to normalize output volume across the plurality of recordings to aid in simplifying training of the machine learning models. Further processing may include using one or more noise reduction or noise cancellation models to generate a cleaner set of data from which the spectrogram representations of the recordings may be generated, as discussed in further detail below.

At block 430, the system trains a plurality of voice recognition models. Each model of the plurality of voice recognition models may be a different type of machine learning model, which may allow for the outputs of these models to be ensembled for use in identifying and authenticating users of a software application when deployed to an interactive voice response system, as discussed in further detail below. For example, in training the plurality of voice recognition models, the system can train an LSTM model, a CNN model, and/or a TCN model independently, using data derived from the received data set. Each of the voice recognition models may be trained based on the spectrograms generated for each of the plurality of recordings in the data set. Generally, in training the plurality of voice recognition models, weight and bias parameters for each of the voice recognition models may be some of the parameters that the voice recognition models can learn based on the spectrogram representations of the plurality of recordings.

In some aspects, to train the machine learning models, the system can randomly select a number of speakers N and a number of utterances M for each speaker from the received data set. A tensor may be generated having dimensions based on the number of speakers N, the number of utterances M for each speaker, and a number of embedding dimensions. This tensor may be used to generate a similarity matrix based on a calculated similarity between each pair of utterances selected from the data set, and a predictive vector may be generated from the generated similarity matrix. In some aspects, the predictive vector may include, for each entry in the similarity matrix, an indication of a speaker predicted to be associated with each of the utterances. The speaker predicted to be associated with each of the utterances may be identified by calculating a loss based on a cross-entropy between the predictive vector and a ground truth vector identifying a speaker associated with each of the utterances.

At block 440, the plurality of voice recognition models are deployed to an interactive voice response system. In some aspects, in deploying the plurality of voice recognition models to the interactive voice response system, the system may generate a lookup table based on the embedding vectors generated for each of the plurality of users for the voice recognition models were trained. To generate the look up table, the system can generate embedding vectors for each respective user of the software application using each of the plurality of voice recognition models. A lookup table may be generated associating each of the generated embedding vectors with an identifier of the respective user, and the generated lookup table may be deployed to the interactive voice response system. The lookup table deployed to the interactive voice response system may allow for embedding vectors generated by one or more machine learning models for an incoming voice recording associated with a support request to be used to look up a user identifier in the lookup table based on comparisons between the embedding vectors generated for the incoming voice recording and the a priori defined embedding vectors associated with each user of the software application.

Figure 5:
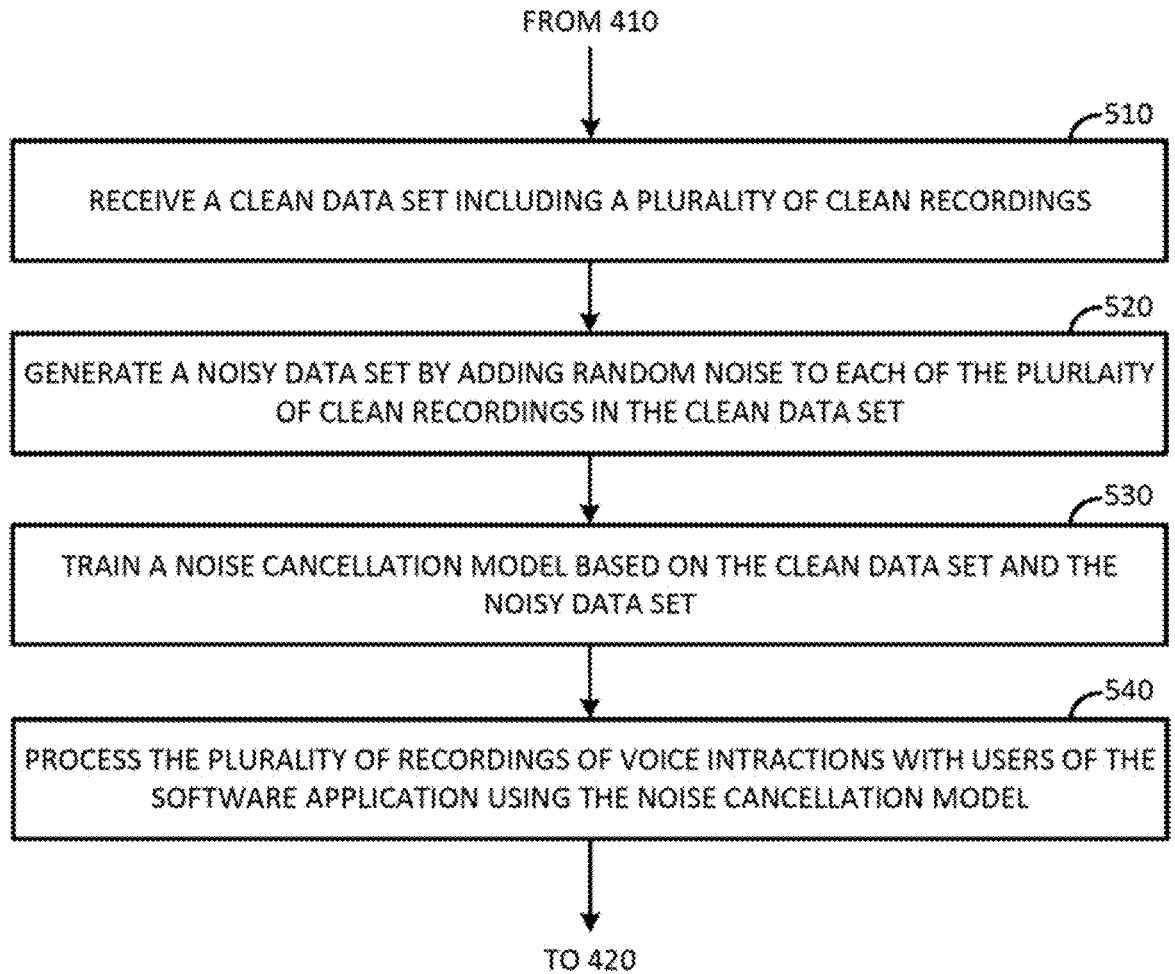
FIG. 5 illustrates example operations for preprocessing recordings of user voice interactions used in training voice recognition models to identify and authenticate users of a software application.

FIG. 5 illustrates example operations 500 for pre-processing the data set including the plurality of recordings of voice interactions used to train the one or more voice recognition models for identifying and authenticating users of a software application. The operations described herein may be executed by one or more systems in a computing environment, such as server 130 illustrated in FIG. 1.

As illustrated, operations 500 may begin at block 510, where the system receives a clean data set including a plurality of clean recordings. The clean data set may include, for example, a data set of recordings having a signal-to-noise ratio exceeding a threshold level, a defined set of recordings recorded in a clean environment, or the like. More generally, the clean data set generally includes audio recordings with sufficient quality that the introduction of noise may replicate the audio quality of recordings captured on poor quality network connections between the user and the interactive voice response system.

At block 520, the system generates a noisy data set by adding random noise to each of the plurality of clean recordings. The random noise may be generated using various random data generation techniques. For example, a Gaussian noise generator may be used to generate and insert random data into each of the plurality of clean recordings. The random noise may also or alternatively be retrieved from a publicly available noise sample database or generated based on noise captured in conversation gaps in a recording of a two-party conversation.

At block 530, the system trains a noise cancellation model based on the clean data set and the noisy data set. The noise cancellation model may be, for example, a deep neural network or other appropriate machine learning model that may be trained to recover a cleaner representation of an input original data source. The system can train the noise cancellation model based on mappings between a recording in the noisy data set and a corresponding recording in the clean data set.

At block 540, the system processes the plurality of recordings in the training data set through the trained noise cancellation model. Generally, the system can generate a data set of noise-reduced recordings by processing each of the plurality of recordings through the trained noise cancellation model. The system can subsequently use the data set of noise-reduced recordings to generate the spectrogram representations for each of the plurality of recordings in the training data set.

Figure 6:
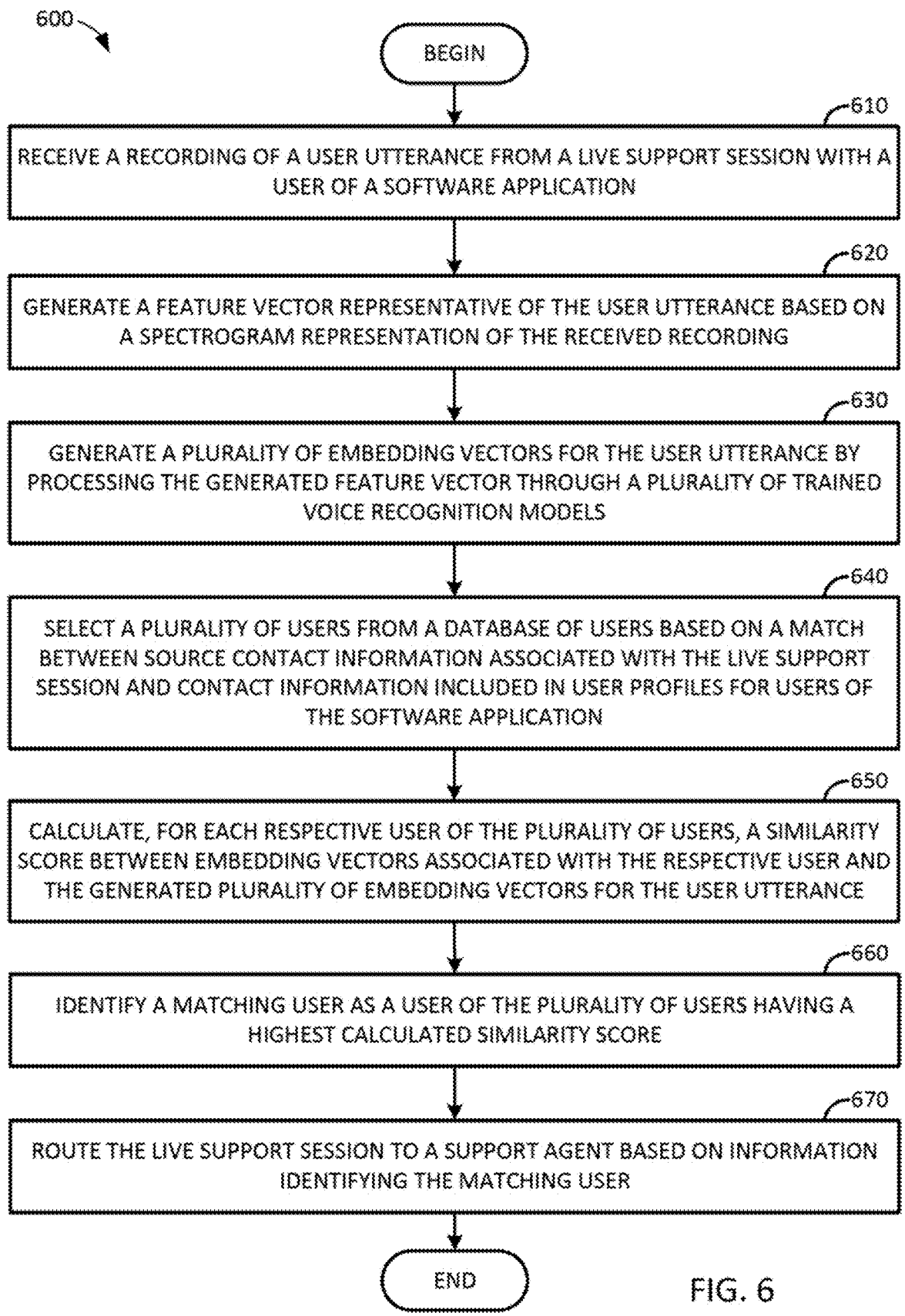
FIG. 6 illustrates example operations for identifying and authenticating users of a software application based on trained voice recognition models.

Example Identification and Authentication of Users of a Software Application Using Voice Recognition Models FIG. 6 illustrates example operations 600 for identifying and authenticating users of a software application using trained voice recognition models. The operations described herein may be executed by one or more systems in a computing environment, such as voice authentication gateway 110 illustrated in FIG. 1.

As illustrated, operations 600 may begin at block 610, where the system receives a recording of a user utterance from, for example, a live support session with a user of a software application. The recording may be an unedited capture of user interaction with the live support session and may be received in a compressed or uncompressed format. Generally, the recording may include a time-domain representation of the user utterance from which a frequency domain representation and a spectrogram can be generated.

At block 620, the system generates a feature vector representative of the utterance based on a spectrogram representation of the received recording. The spectrogram representation of the received recording may be generated, as discussed, by applying a Fourier transform to the time-domain representation of the user utterance to generate a frequency domain representation of the user utterance and by generating an image based on the amplitude at each frequency identified in the frequency domain representation of the user utterance.

At block 630, the system generates a plurality of embedding vectors for the user utterance by processing the generated feature vector through a plurality of trained voice recognition models. The plurality of embedding vectors may include, for example, a first embedding vector generated by an LSTM-based voice recognition model, a second embedding vector generated by a CNN-based voice recognition model, and/or a third embedding vector generated by a TCN-based voice recognition model. Other types and combinations of models are possible.

At block 640, to identify the user with which the received utterance is associated, the system can select a plurality of users from a database of users based on a match between source contact information associated with the live support session and contact information included in user profiles for users of the software application. Generally, selecting the plurality of users based on matching contact information may reduce the number of comparisons performed in identifying and authenticating the user associated with the live support session, which may accelerate the process of identifying and authenticating users using these voice recognition models.

At block 650, the system calculates, for each respective user of a plurality of users, a similarity score between embedding vectors associated with the respective user and the generated plurality of embedding vectors for the user utterance. The similarity score may be based, for example, on a cosine similarity between embedding vectors, or other comparison metrics that may be used to determine a distance between the embedding vector(s) associated with the received recording of the user utterance and predefined embedding vector(s) for a user of the software application. In some aspects, the similarity score may be generated by ensembling the similarity scores generated by each of the trained voice recognition models, with different weights being assigned to the similarity score generated by each of the trained voice recognition models.

At block 660, the system identifies a matching user from the plurality of users. The matching user may be, for example, the user of the plurality of users having a highest calculated similarity score. In some aspects, the system can determine that a matching user does not exist if the similarity scores generated for each of the plurality of users each falls below a threshold score. In such a case, the system can route the live support system to a support agent at block 670 for manual identification and authentication.

At block 670, the system routes the live support session to a support agent. Generally the live support session includes information identifying the matching user, which the support agent may use to render support to the user of the software application, together with other information, such as an intent of a query associated with the received recording of the user utterance. The information identifying the matching user may include, for example, information about the problem that the user is reporting, the product(s) with which the live support session is associated, and the like.

Figure 7:
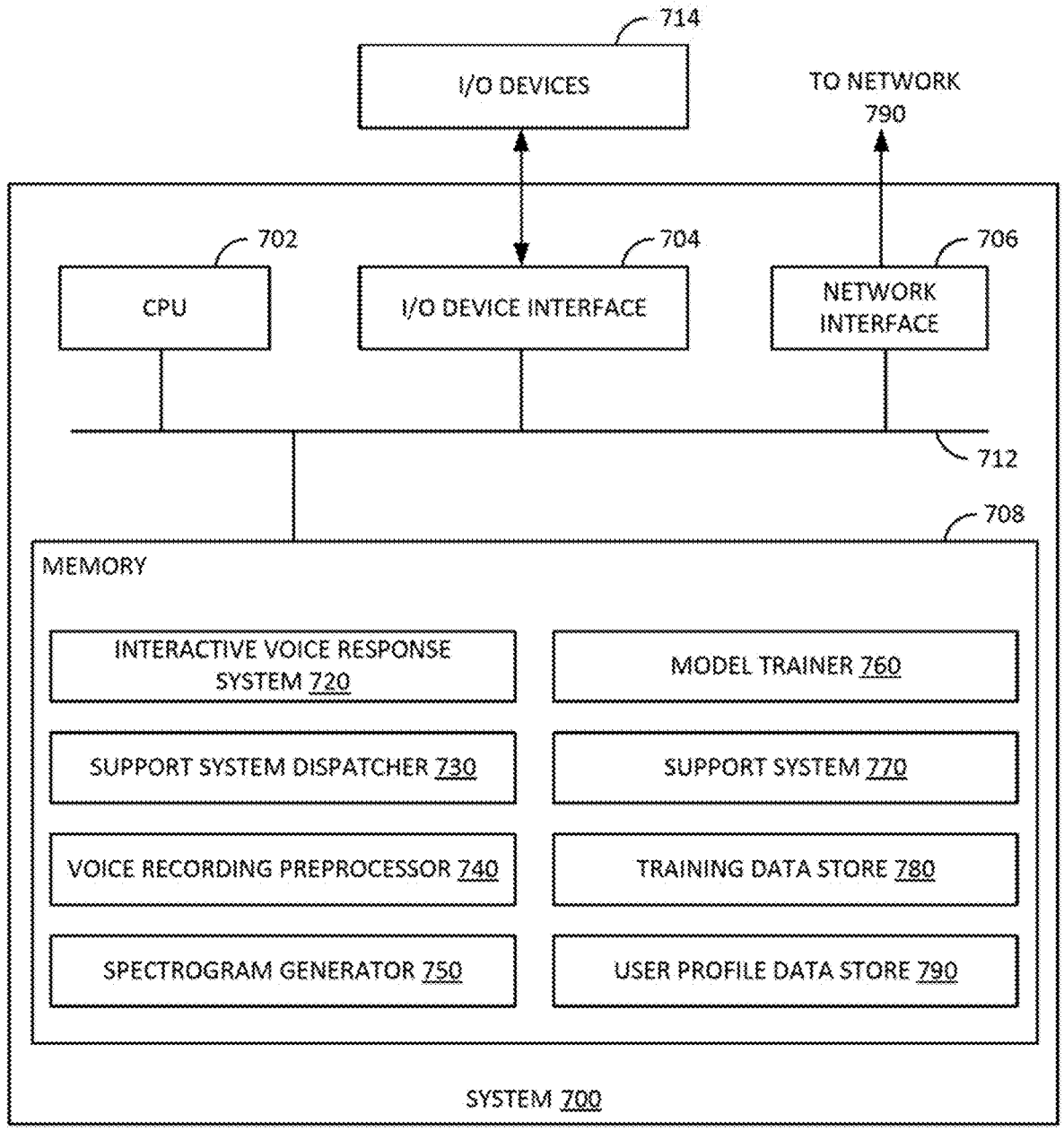
FIG. 7 illustrates an example computing system on which embodiments of the present disclosure may be implemented.

Example Systems for Training and Using Voice Recognition Models for Identifying and Authenticating Users of Software Applications FIG. 7 illustrates an example system 700 that can train and user voice recognition models for identifying and authenticating users of software applications. For example, system 700 may comprise one more of voice authentication gateway 110, support system 120, and/or server 130 illustrated in FIG. 1.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706 through which system 700 is connected to network 770 (which may be a local network, an intranet, the internet, or any other group of computing devices communicatively connected to each other), a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 704, memory 708, and storage 710.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As shown, memory 708 includes an interactive voice response system 720, a support system dispatcher 730, a voice recording preprocessor 740, a spectrogram generator 750, a model trainer 760, a support system 770, a training data store 780, and a user profile data store 790.

Interactive voice response system 720 may correspond to interactive voice response system 112 illustrated in FIG. 1. Generally, interactive voice response system 720 receives incoming support requests from users of a software application and identifies and authenticates the users associated with these incoming support requests using one or more voice recognition models trained by model trainer 760. To identify and authenticate a user, interactive voice response system 720 converts an audio recording associated with an incoming support request into a spectrogram representing the audio recording and processes the spectrogram representation of the audio recording through the one or more voice recognition models to obtain one or more embedding vectors representing the spectrogram representations. The embedding vectors may be compared to embedding vectors generated for each of a plurality of users of the software application (and stored in user profile data store 790, which may correspond to user profile data store 150 illustrated in FIG. 1) in order to obtain an identification of the user associated with the incoming support request.

Support system dispatcher 730 may correspond to support system dispatcher 114 illustrated in FIG. 1. Generally, support system dispatcher 730 uses the user identification generated by interactive voice response system 720 and other information associated with the user to identify the support system 770 (corresponding to support system 120 illustrated in FIG. 1) to which the support request is to be routed for resolution. When the support system is routed to the identified support system 770, support system dispatcher 730 can provide the user identification and other information about the user and the support request so that a user of the support system 770 can have sufficient information to initiate a support session and resolve the support request.

Voice recording preprocessor 740 may correspond to voice recording preprocessor 132 illustrated in FIG. 1. Generally, voice recording preprocessor 740 receives a training data set from training data store 780 (which may correspond to training data store 140 illustrated in FIG. 1) and processes the voice recordings in the training data set to remove silent periods, normalize the volume of the recordings in the training data set, and remove noise from the recordings in the training data set.

Spectrogram generator 750 may correspond to spectrogram generator 134 illustrated in FIG. 1. Generally, spectrogram generator 750 uses the preprocessed recordings generated by voice recording preprocessor 740 to generate spectrograms representing the voice recordings in the training data set. The spectrograms representing the voice recordings in the training data set may be generated by converting (e.g., using a Fourier transform) a time domain representation of a voice recording to a frequency domain representation of the voice recording over each of a plurality of time windows in the voice recording. The generated spectrogram may be a visual representation of the frequency domain representation of the voice recording over the plurality of time windows, with different colors in the spectrogram corresponding to different amplitudes (volumes) at each frequency or range of frequencies in the spectrogram.

Model trainer 760 may correspond to model trainer 136 illustrated in FIG. 1. Generally, model trainer 760 uses the spectrogram representations of the voice recordings in the training data set to train a plurality of voice recognition models deployed to interactive voice response system 720. To train the models, model trainer 760 can extract features from each of the spectrogram representations and generate a feature vector from the extracted features. The feature vector may be transformed into an array of embedding vectors, and a similarity matrix may be generated from the array of embedding vectors. The similarity matrix may include information about N users and N*M samples, where each sample is associated with a predicted user of the N users. The trained models may then be deployed by model trainer 760 to interactive voice response 720 for use.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples.

For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a user detection model to identify a user of a software application based on voice recognition, comprising:
   receiving a data set including a plurality of recordings of voice interactions with users of a software application;
   generating, for each respective recording in the data set, a spectrogram representation based on the respective recording, wherein the spectrogram representation is normalized with respect to a minimum amplitude and a maximum amplitude;
   training a plurality of voice recognition models, wherein each model of the plurality of voice recognition models is trained based on the spectrogram representation for each of the plurality of recordings in the data set;
   selecting, for a selected speaker of a plurality of speakers, an evaluation set of recordings;
   identifying a similar speaker to the selected speaker by:
      providing inputs based on the evaluation set of recordings to one or more of the plurality of voice recognition models, and
      receiving an output from the one or more of the plurality of voice recognition models identifying the similar speaker as the selected speaker;
   re-training the one or more of the plurality of voice recognition models based on a mapping of the selected speaker to the identified similar speaker; and
   deploying the plurality of voice recognition models to an interactive voice response system.

2. The method of claim 1, wherein the plurality of voice recognition models comprise:
   a long-short term memory (LSTM) model;
   a convolutional neural network (CNN) model; and
   a temporal convolutional network (TCN) model.

3. The method of claim 1, further comprising:
   trimming each respective recording in the data set to remove silent periods in each respective voice recording; and
   normalizing each trimmed recording such that a volume of the plurality of recordings in the data set has a similar loudness.

4. The method of claim 1, further comprising:
   receiving a clean data set including a plurality of clean recordings;
   generating a noisy data set by adding random noise to each of the plurality of clean recordings in the clean data set; and
   training a noise cancellation model based on the clean data set and the noisy data set.

5. The method of claim 4, further comprising:
   generating a plurality of noise-reduced recordings by processing each of the plurality of recordings in the data set through the trained noise cancellation model,
   wherein the spectrogram representation generated for each respective recording is generated based on a noise-reduced recording associated with the respective recording.

6. The method of claim 1, wherein training the plurality of voice recognition models comprises:
   randomly selecting a number of speakers and a number of utterances for each speaker from the received data set;
   generating a vector having dimensions based on the number of speakers, the number of utterances for each speaker, and a number of embedding dimensions;
   generating a similarity matrix from the vector based on a calculated similarity between each pair of utterances selected from the data set; and
   generating a predictive vector from the generated similarity matrix.

7. The method of claim 6, wherein the predictive vector includes, for each entry in the similarity matrix, an indication of a speaker predicted to be associated with each of the utterances.

8. The method of claim 7, wherein training the plurality of voice recognition models comprises calculating a loss based on a cross-entropy between the predictive vector and a ground truth vector identifying a speaker associated with each of the utterances.

9. The method of claim 1, further comprising:
   for each respective user of the software application, generating an embedding vectors using each of the plurality of voice recognition models;
   generating a lookup table associating each of the generated embedding vectors with an identifier of the respective user; and
   deploying the generated lookup table to the interactive voice response system.

10. A system, comprising:
    a memory comprising executable instructions; and
    a processor configured to execute the executable instructions and cause the system to:
       receive a data set including a plurality of recordings of voice interactions with users of a software application;
       generate, for each respective recording in the data set, a spectrogram representation based on the respective recording, wherein the spectrogram representation is normalized with respect to a minimum amplitude and a maximum amplitude;
       train a plurality of voice recognition models, wherein each model of the plurality of voice recognition models is trained based on the spectrogram representation for each of the plurality of recordings in the data set;
       select, for a selected speaker of a plurality of speakers, an evaluation set of recordings;
       identify a similar speaker to the selected speaker by:
          providing inputs based on the evaluation set of recordings to one or more of the plurality of voice recognition models, and
          receiving an output from the one or more of the plurality of voice recognition models identifying the similar speaker as the selected speaker;
       re-train the one or more of the plurality of voice recognition models based on a mapping of the selected speaker to the identified similar speaker; and deploy the plurality of voice recognition models to an interactive voice response system.

11. The system of claim 10, wherein the processor is further configured to cause the system to:
trim each respective recording in the data set to remove silent periods in each respective voice recording; and
normalize each trimmed recording such that a volume of the plurality of recordings in the data set has a similar loudness.

12. The system of claim 10, wherein the processor is further configured to cause the system to:
receive a clean data set including a plurality of clean recordings;
generate a noisy data set by adding random noise to each of the plurality of clean recordings in the clean data set;
train a noise cancellation model based on the clean data set and the noisy data set; and
generate a plurality of noise-reduced recordings by processing each of the plurality of recordings in the data set through the trained noise cancellation model,
wherein the spectrogram representation generated for each respective recording is generated based on a noise-reduced recording associated with the respective recording.

13. The system of claim 10, wherein the processor is configured to train the plurality of voice recognition models by:
randomly selecting a number of speakers and a number of utterances for each speaker from the received data set;
generating a vector having dimensions based on the number of speakers, the number of utterances for each speaker, and a number of embedding dimensions;
generating a similarity matrix from the vector based on a calculated similarity between each pair of utterances selected from the data set; and
generating a predictive vector from the generated similarity matrix.

14. The system of claim 10, wherein the processor is further configured to cause the system to:
generate, for each respective user of the software application, an embedding vectors using each of the plurality of voice recognition models;
generate a lookup table associating each of the generated embedding vectors with an identifier of the respective user; and
deploy the generated lookup table to the interactive voice response system.

15. A method for identifying users of a software application based on voice recognition, comprising:
receiving a recording of a user utterance from a live support session with a user of the software application;
generating a feature vector representative of the user utterance based on a spectrogram representation of the received recording, wherein the spectrogram representation is normalized with respect to a minimum amplitude and a maximum amplitude;
generating a plurality of embedding vectors for the user utterance by processing the generated feature vector through a plurality of trained voice recognition models, wherein the plurality of trained voice recognition models was trained through a process comprising:
selecting, for a selected speaker of a plurality of speakers, an evaluation set of recordings;
identifying a similar speaker to the selected speaker by:
providing inputs based on the evaluation set of recordings to one or more of the plurality of trained voice recognition models, and
receiving an output from the one or more of the plurality of trained voice recognition models identifying the similar speaker as the selected speaker;
re-training the one or more of the plurality of trained voice recognition models based on a mapping of the selected speaker to the identified similar speaker;
selecting a plurality of users from a database of users based on a match between source contact information associated with the live support session and contact information included in user profiles for users of the software application;
calculating, for each respective user of a plurality of users, a similarity score between embedding vectors associated with the respective user and the generated plurality of embedding vectors for the user utterance; and
identifying a matching user from the plurality of users as a user of the plurality of users having a highest calculated similarity score; and
routing the live support session to a support agent, wherein the live support session includes information identifying the matching user.

16. The method of claim 15, wherein the plurality of voice recognition models comprise:
a long-short term memory (LSTM) model;
a convolutional neural network (CNN) model; and
a temporal convolutional network (TCN) model.

17. The method of claim 15, wherein:
each model of the plurality of trained voice recognition models is associated with a weight, and
calculating the similarity score between embedding vectors comprises weighting a similarity score between one of the plurality of embedding vectors generated by the model for the user utterance and one of the plurality of embedding vectors generated by the model for the respective user by the weight associated with the model.

18. The method of claim 15, wherein generating the feature vector representative of the user utterance comprises generating a spectrogram representation of the user utterance based on a Fourier transform of the recording of the user utterance.

* * * * *